(12) United States Patent
Venkatasubramanian et al.

(10) Patent No.: US 10,437,846 B2
(45) Date of Patent: Oct. 8, 2019

(54) SYSTEM AND METHOD FOR PROVIDING DATA FLEXIBILITY IN A BUSINESS INTELLIGENCE SERVER USING AN ADMINISTRATION TOOL

(75) Inventors: Raghuram Venkatasubramanian, Cupertino, CA (US); Roger Bolsius, Round Rock, TX (US); Harvard Pan, Boston, MA (US); Alextair Mascarenhas, Foster City, CA (US); Saugata Chowdhury, Sunnyvale, CA (US); Venugopal Surendran, Santa Clara, CA (US); Ananth Venkata, San Ramon, CA (US); Jacques Vigeant, Fort Lauderdale, FL (US)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 539 days.

(21) Appl. No.: 13/100,245

(22) Filed: May 3, 2011

(65) Prior Publication Data
US 2011/0295793 A1 Dec. 1, 2011

Related U.S. Application Data

(60) Provisional application No. 61/349,739, filed on May 28, 2010.

(51) Int. Cl.
*G06F 7/00* (2006.01)
*G06F 17/30* (2006.01)
(Continued)

(52) U.S. Cl.
CPC .......... *G06F 16/254* (2019.01); *G06F 16/283* (2019.01)

(58) Field of Classification Search
CPC . G06F 17/30592; G06F 16/254; G06F 16/283
(Continued)

(56) References Cited

U.S. PATENT DOCUMENTS 6,012,066 A 1/2000 Discount et al.
6,078,925 A * 6/2000 Anderson et al. ............ 707/784
(Continued)

OTHER PUBLICATIONS

Microsoft Corporation, Dimensional Tables, http://msdn.microsoft.com/en-us/library/aa905979(SQL.80,printer).aspx, Downloaded Circa: Jun. 23, 2009, pp. 1-3.
(Continued)

*Primary Examiner* — Kannan Shanmugasundaram
(74) *Attorney, Agent, or Firm* — Tucker Ellis LLP (57) ABSTRACT

An administration tool can be used to provide data flexibility in a business intelligence (BI) server that is associated with a data warehouse. The administration tool can display one or more data objects that are adapted to be imported from an application framework into a physical model maintained on the BI server. The administration tool can further map the one or more data objects in the physical model into a logical model, also maintained on the BI server, which corresponds to at least one target table in the data warehouse. Additionally, the administration tool can publish an extension input to an extender associated with the data warehouse based on the logical model, wherein the extender operates to generate one or more metadata extensions based on the extension input.

20 Claims, 10 Drawing Sheets (51) Int. Cl.
 *G06F 16/25* (2019.01)
 *G06F 16/28* (2019.01)
 *G06F 17/00* (2019.01)

(58) Field of Classification Search
 USPC .......................................................... 707/602
 See application file for complete search history.

(56) References Cited

U.S. PATENT DOCUMENTS

| | | | |
|---|---|---|---|
| 6,356,900 B1 | 3/2002 | Egilsson et al. | |
| 6,594,672 B1 | 7/2003 | Lampson | |
| 6,604,110 B1 | 8/2003 | Savage | |
| 6,684,207 B1 | 1/2004 | Greenfield et al. | |
| 6,970,874 B2 | 11/2005 | Egilsson et al. | |
| 7,010,523 B2 | 3/2006 | Greenfield et al. | |
| 7,089,266 B2 * | 8/2006 | Stolte | G06F 17/30592 707/769 |
| 7,275,024 B2 | 9/2007 | Yeh et al. | |
| 7,318,216 B2 | 1/2008 | Diab | |
| 7,350,191 B1 * | 3/2008 | Kompella | G06F 8/61 707/999.005 |
| 7,401,064 B1 * | 7/2008 | Arone et al. | |
| 7,676,478 B2 | 3/2010 | Rausch | |
| 7,720,803 B2 | 5/2010 | Unnebrink et al. | |
| 7,779,036 B2 | 8/2010 | Subramanian et al. | |
| 7,783,711 B2 | 8/2010 | LeVasseur et al. | |
| 8,086,598 B1 | 12/2011 | Lamb et al. | |
| 8,099,392 B2 | 1/2012 | Paterson et al. | |
| 8,433,673 B2 | 4/2013 | Venkatasubramanian et al. | |
| 2001/0047372 A1 | 11/2001 | Gorelik et al. | |
| 2002/0194167 A1 | 12/2002 | Bakalash et al. | |
| 2003/0229610 A1 | 12/2003 | Van Treeck | |
| 2004/0083199 A1 | 4/2004 | Govindugari et al. | |
| 2004/0122646 A1 | 6/2004 | Colossi et al. | |
| 2004/0139061 A1 | 7/2004 | Colossi et al. | |
| 2005/0033726 A1 | 2/2005 | Wu et al. | |
| 2005/0065939 A1 | 3/2005 | Miao | |
| 2005/0187930 A1 | 8/2005 | Subramanian et al. | |
| 2005/0203931 A1 | 9/2005 | Pingree et al. | |
| 2005/0216503 A1 * | 9/2005 | Charlot | G06Q 50/22 |
| 2006/0059028 A1 | 3/2006 | Eder | |
| 2006/0101017 A1 | 5/2006 | Eder | |
| 2006/0112123 A1 | 5/2006 | Clark | |
| 2006/0259507 A1 | 11/2006 | Higuchi | |
| 2006/0271528 A1 | 11/2006 | Gorelik | |
| 2007/0005713 A1 | 1/2007 | LeVasseur et al. | |
| 2007/0174308 A1 | 7/2007 | Rausch | |
| 2007/0198972 A1 * | 8/2007 | Hogg et al. | 717/140 |
| 2007/0214111 A1 | 9/2007 | Jin et al. | |
| 2007/0226196 A1 * | 9/2007 | Adya | G06F 17/30457 |
| 2007/0255741 A1 | 11/2007 | Geiger et al. | |
| 2008/0027769 A1 | 1/2008 | Eder | |
| 2008/0033914 A1 | 2/2008 | Cherniack et al. | |
| 2008/0115135 A1 | 5/2008 | Behnen et al. | |
| 2008/0140692 A1 | 6/2008 | Gehring | |
| 2009/0018996 A1 | 1/2009 | Hunt et al. | |
| 2009/0043778 A1 | 2/2009 | Jambunathan | |
| 2009/0083652 A1 * | 3/2009 | Krasner et al. | 715/772 |
| 2010/0088669 A1 | 4/2010 | Cwalina et al. | |
| 2010/0106672 A1 | 4/2010 | Robson et al. | |
| 2011/0004617 A1 | 1/2011 | Mineno | |
| 2011/0125705 A1 * | 5/2011 | Aski | G06F 8/30 707/602 |
| 2013/0066826 A1 | 3/2013 | McDonald et al. | |

OTHER PUBLICATIONS

Borysowich C. Identifying Dimension Tables (Data Warehouse), http://it.toolbox.com/blogs/enterprise-solutions/identifying-dimension-tables-data-warehouse-20811, Downloaded Circa: Jun. 23, 2009, pp. 1-3.

Chu, K. et al., Oracle Application Development Framework, Jun. 2006, pp. 1-1160.

Munsinger, L., Oracle Application Development Framework Overview, Feb. 2006, pp. 1-11.

Oracle Corporation, Oracle Business Intelligence Server Administration Guide, Version 10.1.3.2, Publication Date: Dec. 2006, pp. 1-432.

United States Patent and Trademark Office, Notice of Allowance and Fee(s) Due dated Aug. 24, 2016 for U.S. Appl. No. 13/100,248, 15 Pages.

United States Patent and Trademark Office, Office Action dated Nov. 5, 2018 for U.S. Appl. No. 13/100,255, 29 Pages.

* cited by examiner

| DEP1_PK1_VALUE | DEP1_PK1_DESCRIPTION | DEP | DEP1_PK1_DESCRIPTION | DEP1 | DEP1_PK2_DESCRIPTION | DEP1 | DEP1_PK3_DESCRIPTION |
|---|---|---|---|---|---|---|---|
| 100 | Vision Corporation | 110 | Support | 113 | General and Administration | 110 | General and Administration |
| 100 | Vision Corporation | 120 | Support | 123 | Support | 120 | Support |
| 100 | Vision Corporation | 130 | Software | 130 | Software | 130 | Software |
| 100 | Vision Corporation | 150 | Hardware | 151 | Marketing | 152 | Western US - Marketing |
| 100 | Vision Corporation | 150 | Hardware | 151 | Marketing | 153 | Midwest US - Marketing |
| 100 | Vision Corporation | 150 | Hardware | 151 | Marketing | 154 | South East US - Marketing |
| 100 | Vision Corporation | 150 | Hardware | 151 | Marketing | 155 | North East US - Marketing |
| 100 | Vision Corporation | 150 | Hardware | 160 | Consulting | 160 | Consulting |
| 100 | Vision Corporation | 150 | Hardware | 170 | Sales | 170 | Sales |
| 100 | Vision Corporation | 150 | Hardware | 170 | Sales | 171 | Western US - Hardware Sales |
| 100 | Vision Corporation | 150 | Hardware | 170 | Sales | 172 | Midwest US - Hardware Sales |
| 100 | Vision Corporation | 150 | Hardware | 170 | Sales | 173 | South East US - Hardware Sales |
| 100 | Vision Corporation | 150 | Hardware | 170 | Sales | 174 | North East US - Hardware Sales |

```
SELECT code_combination_id, segment3 account, segment1 company,
segment2 cost_center, segment5 product, segment4 subaccount
FROM gl_code_combinations
```

| CODE_COMBINATION_ID | ACCOUNT | COMPANY | COST_CENTER | PRODUCT | SUBACCOUNT |
|---|---|---|---|---|---|
| 16720 | 8100 | 01 | 510 | | 000 |
| 16723 | 7870 | 01 | 510 | | 000 |
| 16724 | 7880 | 01 | 510 | | 000 |
| 16726 | 7710 | 01 | 510 | | 000 |
| 16727 | 7730 | 01 | 510 | | 000 |
| 16730 | 1650 | 01 | 560 | | 000 |
| 16667 | 4110 | 01 | 450 | | 000 |
| 16668 | 4120 | 01 | 450 | | 000 |
| 16669 | 4130 | 01 | 450 | | 000 |
| 16675 | 7640 | 01 | 440 | | 000 |

SYSTEM AND METHOD FOR PROVIDING DATA FLEXIBILITY IN A BUSINESS INTELLIGENCE SERVER USING AN ADMINISTRATION TOOL

CLAIM OF PRIORITY

This application claims priority to the following application, which is hereby incorporated by reference in its entirety: U.S. Provisional Application No. 61/349,739, entitled "SYSTEM AND METHOD FOR PROVIDING DATA FLEXIBILITY IN A BUSINESS INTELLIGENCE (BI) SERVER", filed on May 28, 2010.

CROSS REFERENCE TO RELATED APPLICATIONS

This application is related to the following applications which are incorporated herein by reference:

U.S. patent application Ser. No. 12/711,269 entitled "GENERATION OF STAR SCHEMAS FROM SNOWFLAKE SCHEMAS CONTAINING A LARGE NUMBER OF DIMENSIONS," by Samir Satpathy et al., filed on Feb. 24, 2010, which is now U.S. Pat. No. 8,543,535, issued on Sep. 24, 2013.

U.S. patent application Ser. No. 13/100,248, entitled "SYSTEM AND METHOD FOR SPECIFYING METADATA EXTENSION INPUT FOR EXTENDING DATA WAREHOUSE" by Raghuram Venkatasubramanian et al., filed on May 3, 2011.

U.S. patent application Ser. No. entitled "SYSTEM AND METHOD FOR SUPPORTING DATA WAREHOUSE METADATA EXTENSION USING AN EXTENDER" by Raghuram Venkatasubramanian et al., filed on , which is now U.S. Pat. No. 8,433,673, issued Apr. 30, 2013.

U.S. patent application Ser. No. 13/100,255, entitled "SYSTEM AND METHOD FOR ENABLING EXTRACT TRANSFORM AND LOAD PROCESSES IN A BUSINESS INTELLIGENCE SERVER" by Raghuram Venkatasubramanian et al., filed on May 3, 2011.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The present invention generally relates to data warehouses and business intelligence, and particularly to supporting data flexibility for a business intelligence (BI) server.

BACKGROUND

In the context of computer software, and particularly computer databases, the term "data warehouse" is generally used to refer to a unified data repository for all customer-centric data. A data warehouse environment tends to be quite large. The data stored in the data warehouse can be cleaned, transformed, and catalogued. Such data can be used by business professionals for performing business related operations, such as data mining, online analytical processing, and decision support. Typically, a data warehouse can be associated with extract, transform, and load (ETL) processes and business intelligence tools. The ETL processes are capable of extracting data from source systems and bringing the data into a data warehouse. The business intelligence tools are designed to report, analyze and present data stored in the data warehouse. This is the general area that embodiments of the invention are intended to address.

SUMMARY

In accordance with an embodiment, an administration tool can be used to provide data flexibility in a business intelligence (BI) server that is associated with a data warehouse. The administration tool can display one or more data objects that are adapted to be imported from an application framework into a physical model maintained on the BI server. The administration tool can further map the one or more data objects in the physical model into a logical model, also maintained on the BI server, which corresponds to at least one target table in the data warehouse. Additionally, the administration tool can publish an extension input to an extender associated with the data warehouse based on the logical model, wherein the extender operates to generate one or more metadata extensions based on the extension input.

BRIEF DESCRIPTION OF THE FIGURES

FIG. 7 illustrates an exemplary table that shows a flattened view object in accordance with an embodiment.

DETAILED DESCRIPTION

The present invention is illustrated, by way of example and not by way of limitation, in the figures of the accompanying drawings in which like references indicate similar elements. It should be noted that references to "an" or "one" or "some" embodiment(s) in this disclosure are not necessarily to the same embodiment, and such references mean at least one. The description of the embodiments of the invention as following uses the Oracle Database Integrator (ODI) data warehouse and Informatica (INFA) data warehouse as examples for data warehouse platform. It will be apparent to those skilled in the art that other types of data warehouse platform can be used without limitation. The description of the embodiments of the invention as following uses the Oracle Application Development Framework (ADF) as examples for application framework. It will be apparent to those skilled in the art that other types of application framework can be used without limitation.

As described herein, a data warehouse can be used to store critical business information. Business intelligence (BI) applications running on top of the data warehouse can provide powerful tools to the users for managing and operating their business. These BI tools can not only help the users run their day-to-day business, but also help the users make critical tactical, or even long term strategic, business decisions.

There can be different types of BI applications used in the enterprise environment, such as sales, marketing, supply chain, financial, and human resource applications. An application framework, such as ADF, can be used to implement the different types of BI applications. Each BI application can store and use one or more application data objects in its own application data store, outside of the data warehouse.

A BI server can reside between the BI applications and the data warehouse. The BI server allows the BI applications to use high-level analytical queries to scan and analyze large volumes of data in the data warehouse using complex formulas, in order to provide efficient and easy access to information required for business decision making. The BI applications can rely on the BI server to fulfill its analytic requirement.

A data warehouse can be sourced from multiple data source systems associated with the BI applications. As such, a BI server can associate an entity in the target data warehouse with data objects from multiple data sources, by extracting data from the various data sources into a single staging area, where the data conformance is performed before the conformed data can be loaded into the target data warehouse.

Furthermore, when BI applications make changes, or extensions, on the application data objects in application data store. The BI server can propagate the changes and the extensions on the application objects in the application framework to the underlying data warehouse that stores the data in the application objects.

The BI server uses extract, transform, and load (ETL) processes to extract data from the outside data sources, transform the source data to fit operational needs, and load the data into the target data warehouse. ETL metadata can be used to define and manage the ETL processes associated with the data warehouse. Such metadata are essential to the data warehouse and the BI systems on top of the data warehouse. An administration tool on the BI server allows a user to interact with the BI server, and manage the extension process of the underlying data warehouse through metadata.

Figure 1:
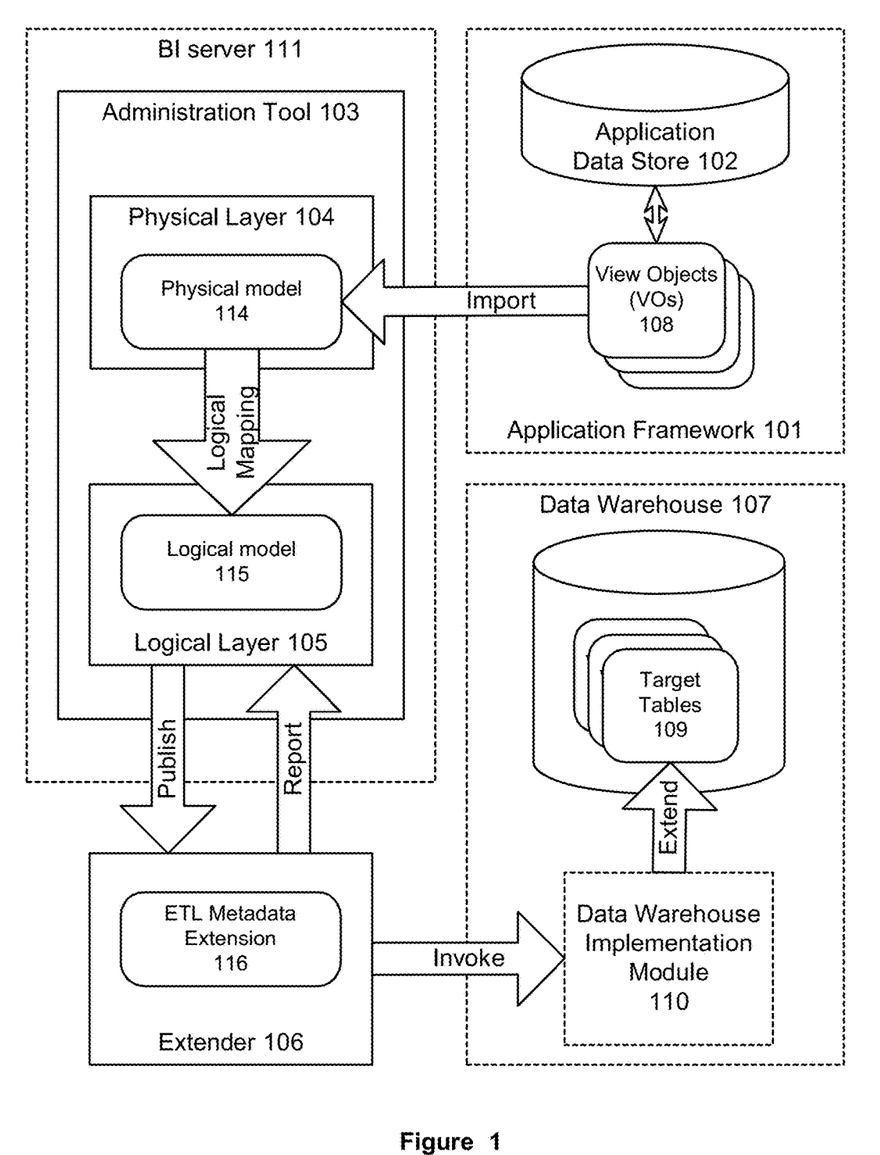
FIG. 1 illustrates an exemplary view of the data flow from an application framework to a data warehouse in accordance with an embodiment.

FIG. 1 illustrates an exemplary view of the data flow from an application framework to a data warehouse in accordance with an embodiment. As shown in FIG. 1, one or more application data objects, such as view objects (VO) 108 that are associated with the data in the application data store 102, can be used in an application framework 101, such as an application development framework (ADF). In an embodiment, the VOs can have a query that fetches a record from an application data store. In another embodiment, the VOs can contain implementation logic which is used to manipulate the data fetched by the VO query.

An administration tool 103, provided by a BI server 111, includes a physical layer 104 and a logical layer 105. The physical layer of the administration tool defines the data sources, to which the BI server 110 submits queries. The physical layer includes a physical model 114 that defines the relationships between the physical source databases and other data sources that are used to process multiple data source queries. The logical layer of the administration tool captures business, or logical, model of the data. The logical layer uses a logical data model 115 that defines the data in a data warehouse 107 in detail, without regard to how they are physical implemented in the database.

The administration tool allows the VOs to be imported from the application framework into the physical model based on related metadata. Then, the updated physical model in the physical layer can be mapped to the logical model in the logical layer within the BI server administration tool.

The administration tool can detect changes in the VOs and publish these changes to a backend extender 106 associated with the data warehouse. The extender can make changes to ETL metadata before applying the changes to the target tables 109 in the underlying data warehouse. The ETL metadata can include information on data transformation logics, data manipulation language (DML) options and target/source table.

The backend extender can generate one or more metadata extensions 116 based on changes in the VOs. The metadata extensions include detail metadata changes that can be used by the extender to extend the data warehouse.

Also as shown in FIG. 1, the ETL metadata extensions can be relayed from the extender back to the administration tool. The administration tool can then update the logical model, physical model, and related metadata, and allow the extender to extend the data warehouse.

In an embodiment, the extender can invoke an implementation module 110 that is associated with the data warehouse to make physical changes on the target tables in the data warehouse. Since the implementation and internal structure of the data warehouse varies, different implementation modules can be invoked by the extender for extending different data warehouses. Furthermore, the implementation module can be provided by a particular underlying data warehouse, so that the implementation module can have access to the target tables from within the data warehouse.

Figure 2:
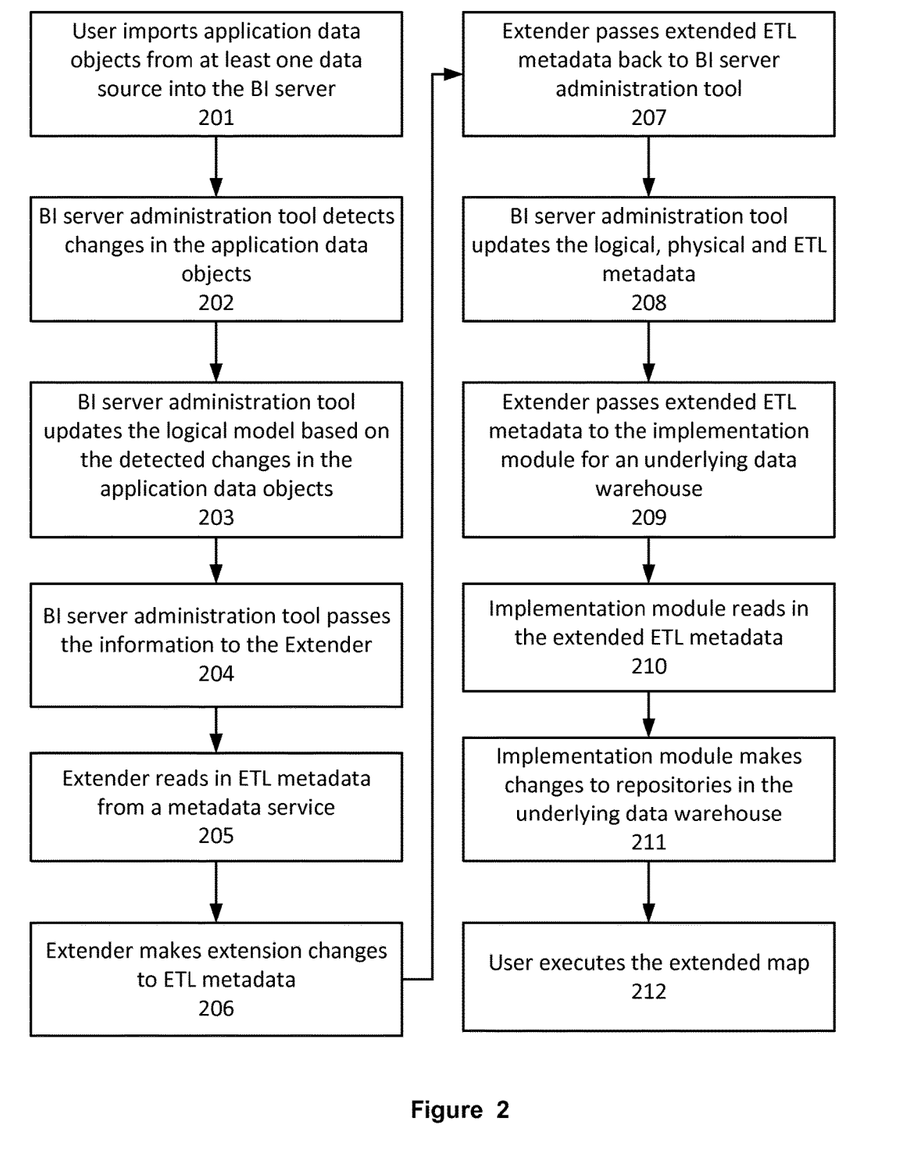
FIG. 2 illustrates an exemplary work flow for supporting data flexibility in a business intelligence server associated with a data warehouse in accordance with an embodiment.

FIG. 2 illustrates an exemplary work flow for supporting data flexibility in a business intelligence server associated with a data warehouse in accordance with an embodiment. As shown in FIG. 2, a user can first import application data objects from the application framework into a physical model in the logical layer, via the BI server administration tool, at step 201. The BI server administration tool can detect changes in the application data objects, at step 202, and updates the logical model in the logical layer based on the detected changes in the application data objects, at step 203. Then, the BI server administration tool can pass the information to the extender, at step 204. Since the imported information from the application framework may not be sufficient, the extender can read in ETL metadata from a metadata service (MDS), at step 205. Then, the extender can make extensions to the ETL metadata at step 206, and passes the extended information back to the administration tool at step 207. After the BI server administration tool updates the logical model, physical model and ETL metadata, at step 208, the extender passes the extended ETL metadata to a data warehouse implementation module to update the data warehouse, at step 209. Finally, the data warehouse implementation module can read in the extended ETL metadata, at step 210, and make changes to the data repositories, at step 211, before a user can execute the extended maps, at step 212.

Importation of Application Metadata

In accordance with an embodiment, the administrator tool can use a wizard to import the updated application metadata into the physical layer. The import wizard can lead the user through a series of steps. Additionally, the import process can provide a view of the imported physical layer before actually applying all the changes.

Figure 3:
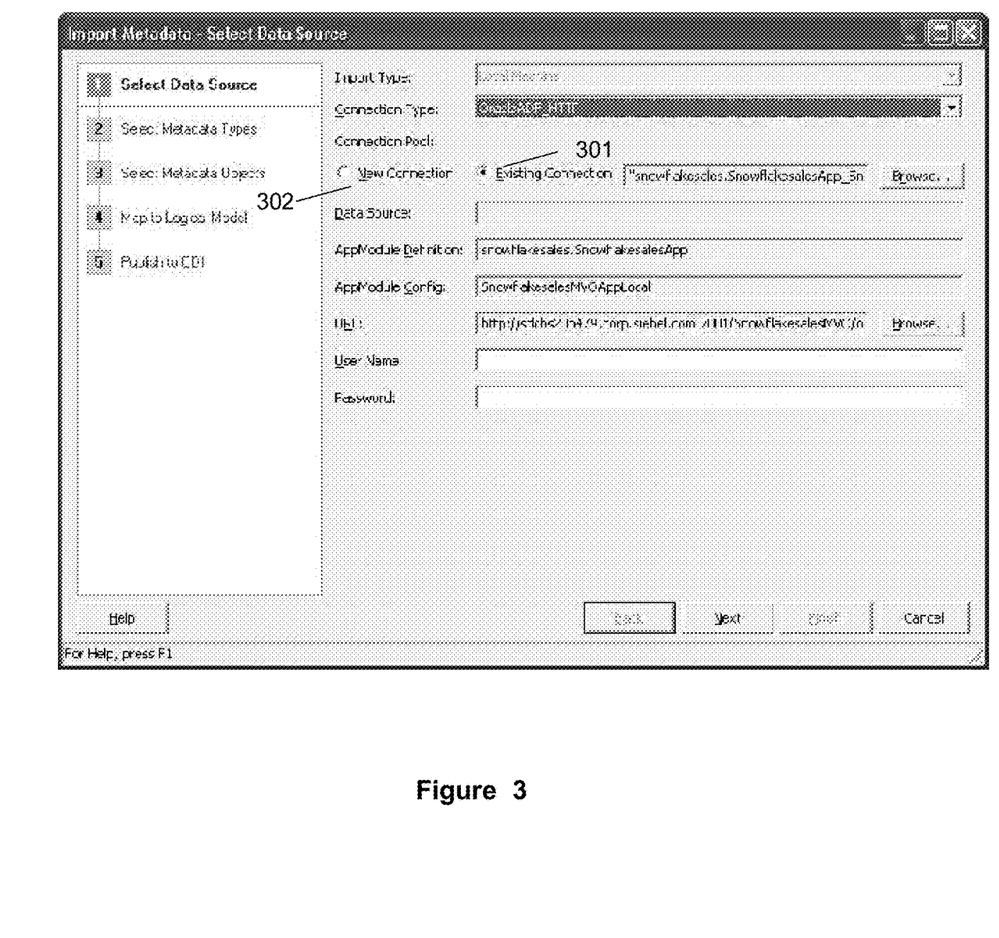
FIG. 3 illustrates an exemplary user interface for importing application metadata from a data source in a connection pool in accordance with an embodiment.

In accordance with an embodiment, the wizard can use a connection pool to import the application data objects from different data sources into the physical layer. FIG. 3 illustrates an exemplary user interface for importing application metadata from a data source in a connection pool in accordance with an embodiment. As shown in FIG. 3, there can be an option to either use an existing connection pool, or fill in the details of a new connection pool. When the "Existing Connection" radio button 301 is selected, all fields are read-only except for Username and Password. The wizard can also be started manually using the File→Import Metadata menu option, in which case the "New Connection" radio button 302 is selected by default. By using an existing connection pool, users can update their existing model with changes on the database. As shown in FIG. 3, users can start an import process by selecting on an existing connection pool. This action can start the wizard and pre-populate the information in the wizard with the information in the existing connection pool. Additionally, modifications to properties of attributes in the VOs can be tracked and detected. For example, if an attribute in the VOs changes its data type, that change can be propagated to the physical layer objects.

In accordance with an embodiment, synchronization can be achieved between the physical model that represents the physical metadata in the repository and the actual structure in the data source. Synchronization logic can be used for implementing the intelligent incremental import, such that the changes in the source system can always be identified.

The incremental changes in the source system can include additions, deletions, and modifications of any application object in the data source. In an embodiment, the administration tool can synchronize the changes identified as the use cases, such as adding a new dimension to a fact, or the extension of the key flex field on the fact, instead of synchronizing the entire data source.

In accordance with an embodiment, in order to support intelligent incremental import, the connection pool can be used along with wizard logic to detect modified objects brought into the import infrastructure, and handle synchronization after the additions of tables, columns, keys, and foreign keys.

Figure 4:
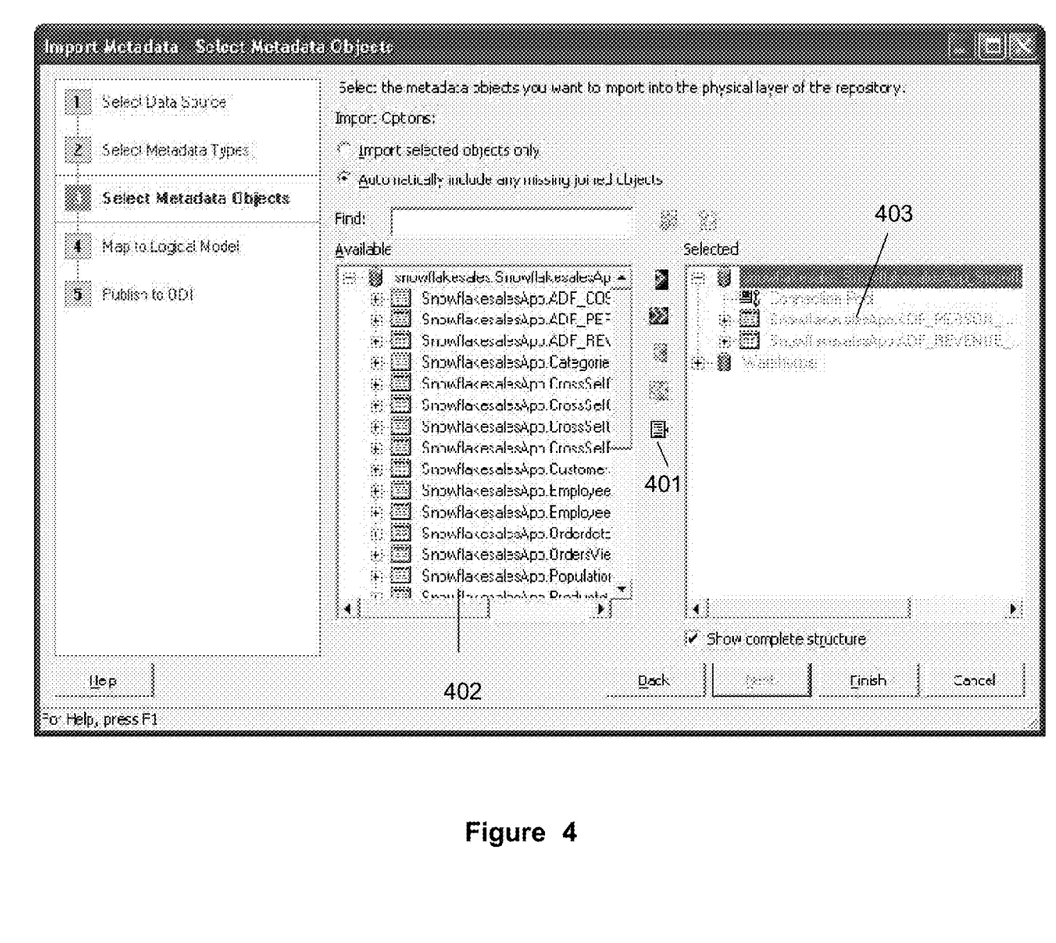
FIG. 4 illustrates an exemplary user interface for importing metadata objects into the physical layer in accordance with an embodiment.

FIG. 4 illustrates an exemplary user interface for importing metadata objects into the physical layer in accordance with an embodiment. As shown in FIG. 4, there can be a synchronize button 401, in the exemplary user interface, that can be used to automatically detect incremental changes in application objects for the user. The synchronize button can use an incremental logic to detect changes in columns. The synchronize button can also instruct the system to detect additions and deletions of tables and columns. Furthermore, the synchronize button can instruct the system to detect additions of keys and foreign keys and allow the automatic importation of newly join tables without user specification, which is important for the cases when new key flexfields (KFF) segments come in as dimensions. The exemplary user interface, as shown in FIG. 4, provides two grids 402 and 403 that allow users to select from available metadata objects or VOs, and handle naming inconsistencies between the existing objects and the newly imported VOs.

In an embodiment, when a column is imported from a source table into the physical model, there is a possibility that the object is part of a source table in other alias table source. Columns can automatically be created on the alias tables. During the mapping phase, these new alias columns can be displayed in the mapping grid, even though they were not explicitly imported from an actual backend column.

Logical Mapping

In accordance with an embodiment, a user can take advantage of the drag and drop feature in the administration tool, provided by the BI server, to map the physical model in the physical layer into the logical model in the logical layer and achieve incremental modifications to the logical model.

Figure 5:
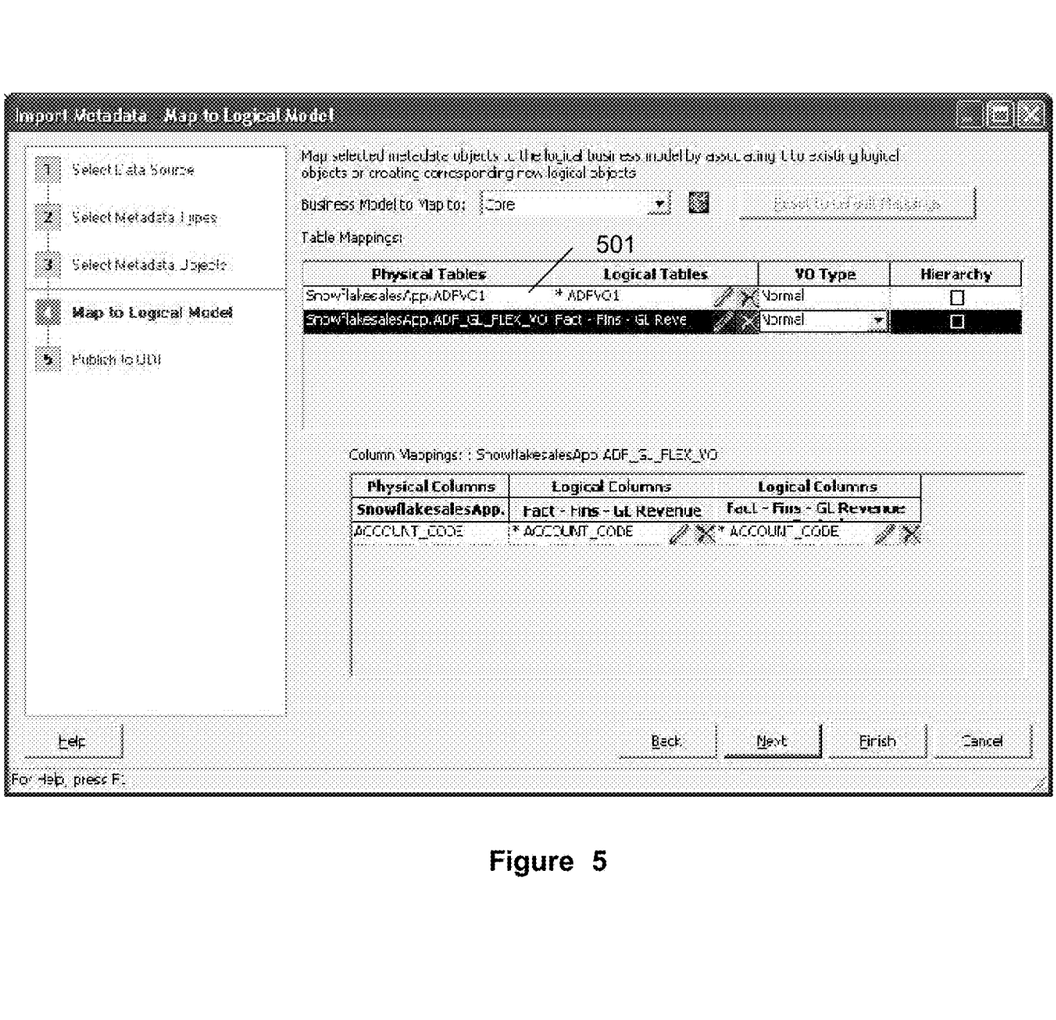
FIG. 5 illustrates an exemplary user interface for mapping the physical layer to the logical layer in accordance with an embodiment.

FIG. 5 illustrates an exemplary user interface for mapping the physical layer to the logical layer in accordance with an embodiment. As shown in FIG. 5, users do not need to exit the import wizard. The mapping grid 501 can map a single physical table to one or more logical tables, and vice versa. The mapping grid can be pre-populated with the results of what the drag and drop feature in the administration tool provides. By default, the administration tool can pre-select a logical table for the users. For each physical table selected, users can select multiple logical tables that the selected physical table can be mapped to. Users can control the mapping relationships and reuse the existing logical tables.

In accordance with an embodiment, a framework can be used to encapsulate rules for metadata conversions between the physical layer and the logical layer. The entire movement of metadata can be encapsulated in a metadata update transaction. Furthermore, given the differences in rules for each different database type and how they are mapped, the rules can be established in a single location, where the rules can be easily extended and read for modules.

In accordance with an embodiment, the users can make customizations to the default behavior of drag and drop, which can give the users more flexibility and power over the entire process. Based on the framework established for mapping physical objects to logical objects, drag and drop code can simply call the framework and have it handle all the cases for drag and drop. By doing so, the administration tool can automatically synchronize the abilities of drag and drop and the wizard mapping, allowing for a single consistent behavior no matter how you decide to map your objects.

Furthermore, rules can be contained within other rules. In an embodiment, if the target object is a business model, the source physical objects can be passed to the rule that targets the logical tables. User inputs can include the mappings that the user has chosen to better aid the rule in determining what to do.

In accordance with an embodiment, a rule can encapsulate an input/output mechanism for mapping the physical layer to the logical layer. In an embodiment, the basic input for the mapping includes: Database Type, Target Logical Object, Source Physical Objects, and User Input. And the Output includes: New, modified, and deleted objects.

In an embodiment, a rule can have the following logic: first, loop through the source physical objects to see if any of them apply to the target logical object; if there are existing objects that can be modified it, then modify them; if not, create new objects; and finally, pass along the objects to the next rule that should be run.

As shown in FIG. 5, a single flattened VO can be mapped to multiple different logical dimensions and a fact table. Upon importing new columns into this flattened VO, a user can specify that the new column is associated with one of the several logical dimensions or the fact table. The mapping relationship of the new column can then be specified in the column mappings table. In the mapping table 501, there can be two additional columns in the table grid, VO Type and Hierarchy, to allow the user to specify additional property associated with a particular imported VO. Each VO type field in the drop-down list can be one: "Normal", "ETL Only", and "Query Only."

In accordance with an embodiment, once the physical model has been moved successfully to the logical model, the backend extender can be used to discover the changes that are necessary to propagate to the target system.

Interaction with the Extender

In accordance with an embodiment, the administration tool can propagate the changes in the application objects to an extender in the backend, after updating the logical model in the logical layer.

Figure 6:
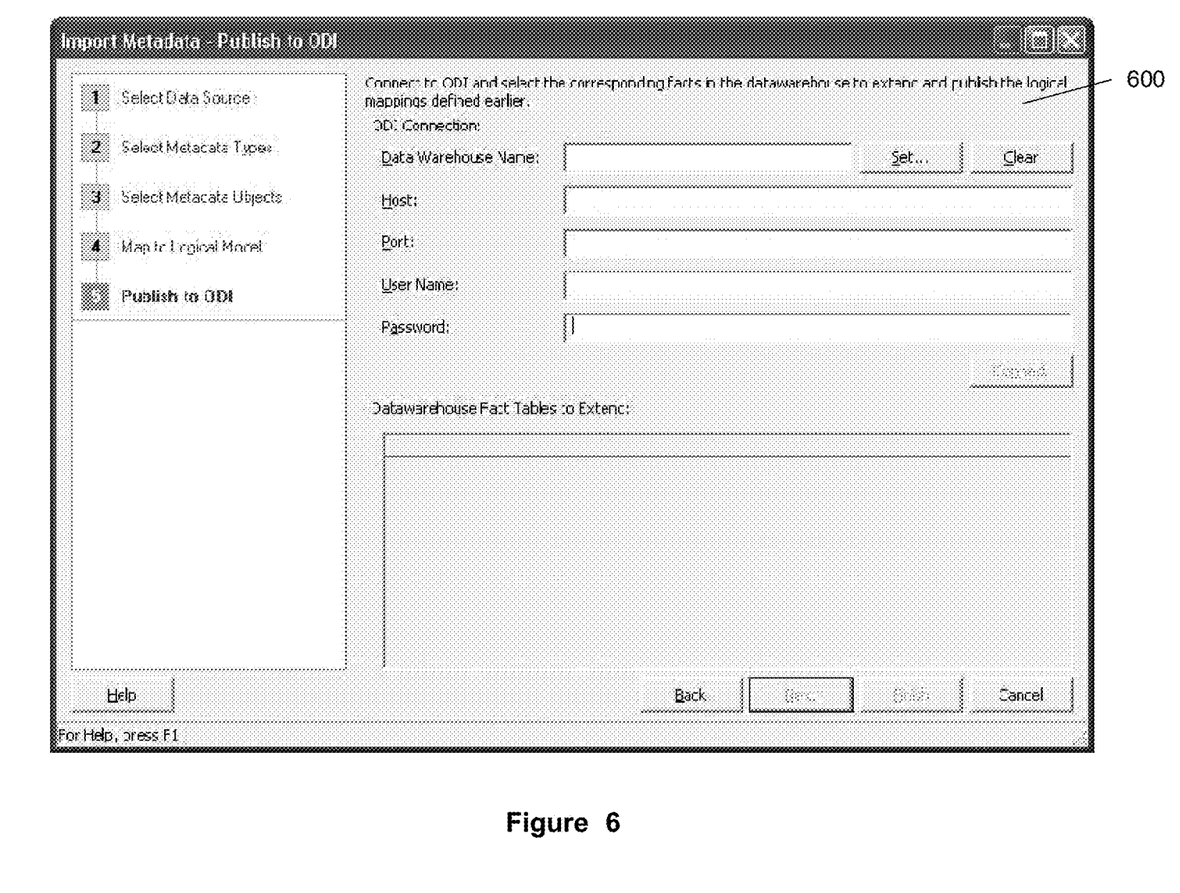
FIG. 6 illustrates an exemplary user interface for publishing the changes made in the physical layer and the logical layer in accordance with an embodiment.

FIG. 6 illustrates an exemplary user interface for publishing the changes made in the physical layer and the logical layer in accordance with an embodiment. As shown in FIG. 6, the "Import Metadata—Publish to ODI" user interface 600 allows the user to connect with a data warehouse extender and select the corresponding target tables in the data warehouse to be extended and publish the logical mappings.

The administration tool is capable of generating an extension input for the backend extender. Such an extension input includes information not only on the extension metadata structures, but also on what the Extender is expecting as input. The administration tool can then depend on an XSL transformation to transform the administration tool output into a format that is acceptable to the Extender.

The extender takes an input specification in XML format from the administration tool and returns an XML output document to the administration tool. The input specification contains the information on the objects to be extended, the columns, the source objects, joins and column mappings desired. The output document contains information on the warehouse objects created or modified. The output document also contains new objects created and/or new columns created. This information can be used by the administration tool to extend the warehouse definition in a repository model (RPD).

In accordance with an embodiment, the extender does not make direct changes to the underlying data repositories. The extensions can be done on ETL metadata, such as information on transparent views (TVs), data manipulation language (DML) options and target/source tables. Such metadata information can be relayed back to the Administrator. The Administrator can then update the logical, physical and ETL metadata, and the Extender can then invoke individual implementation module to extend the data warehouse. The implementation modules take the ETL metadata and implement individual maps for any fact or dimension. The implementation modules for each specific data warehouse can have no concept of extensions.

Flexfields

In accordance with an embodiment, a BI server can support data extensions in applications through "Flexfields." Flexfields are columns within tables that can be repurposed/reused based on a user specified context. There can be different types of extensions for different types of flexfields: Key flexfields (KFF) and Descriptive flexfields (DFF). In an embodiment, the BI server assumes that the KFF segments comes in as new dimensions joined to an existing fact table, and the DFF segments comes in as new attributes on both facts and dimensions on existing tables.

In accordance with an embodiment, an imported VO can be used for extending the ETL mappings instead of querying the data store. The imported VO can be marked as disabled in the logical layer, so that the behavior of the extender is not changed. When an imported VO is marked as "Query Only," the imported VO is not extended, and can not be passed to the extender. Additionally, using the imported VO, users can selectively filter exactly what is going into the extensions.

The imported VO can be mapped into an existing logical dimension table that has logical table source (LTS) mapping to an underlying data warehouse. Rather than creating new columns in the underlying data warehouse, the user can use the existing mappings depending on the user selections. The extender can use these pre-existing columns to perform the extensions.

In an embodiment, an imported View Object can be a Hierarchy VO. The Hierarchy VOs are treated differently from the normal VOs. The user can mark a VO to be a Hierarchy VO, and select the lookup column on the non-Hierarchy VO. This information can be passed along to the extender. In an embodiment, the extender can generate both a base table and a hierarchy table in the data warehouse, based on multiple required fields on the source and destination, such as HIERARCHY_NAME and DATA-SOURCE_NUM_ID.

Translations can be stored in a separate VO in the source system than the base VO, in a manner similar to the Hierarchy use case. In an embodiment, LANG_ID can be a required source column. In an embodiment, the extender can use a special template, such as a KeyFlexTranslationCreationStandard template, to create two separate tables in the data warehouse.

Certain VOs come in with predefined filters. These filters can be placed in the LTS content filter automatically. For example, the extender can configure the LTS filters for GL accounts by putting appropriate segment label in the filters.

In an embodiment, a fact foreign key can exist in its own separate dimension. One example is a special VO that is mapped to its own dimension on the logical layer. The foreign key on the dimension can be pushed onto every single fact table that is joined to the special VO.

In an embodiment, the Integration ID is a combination of different fields used to indicate uniqueness of a particular row. The Integration ID can be used to identify and equalize among different sources. In some embodiments, The Integration ID column can be passed as the key of the concatenation of other key values. This can be supported in an XSL transformation that can convert all keys into the lookup-mappings in an extender input specifications.

In accordance with an embodiment, application level entities, such as VOs, can be organized in hierarchies/trees, such as directed acyclic graphs. The VO contains the key and attributes at each level of the hierarchy. In accordance with an embodiment, when KFF segments are sourced from hierarchical objects such as trees, the segment VOs can be flattened to include all the level keys and level attributes. Additionally, an application can have a restriction on how many levels in a tree that it can flatten. The application can ensure that the lowest level, or the leaf level, is always present in the VO, since the fact table's grain is at the lowest level.

FIG. 7 illustrates an exemplary table that shows a flattened VO in accordance with an embodiment. As shown in FIG. 7, a flattened VO 700 for a segment "Company," which contains a key at each level, is sourced from a tree with four levels. In this example, the only attribute at each level is a description. In other embodiments, the flattened VO allows several attributes at each level.

Figure 8:
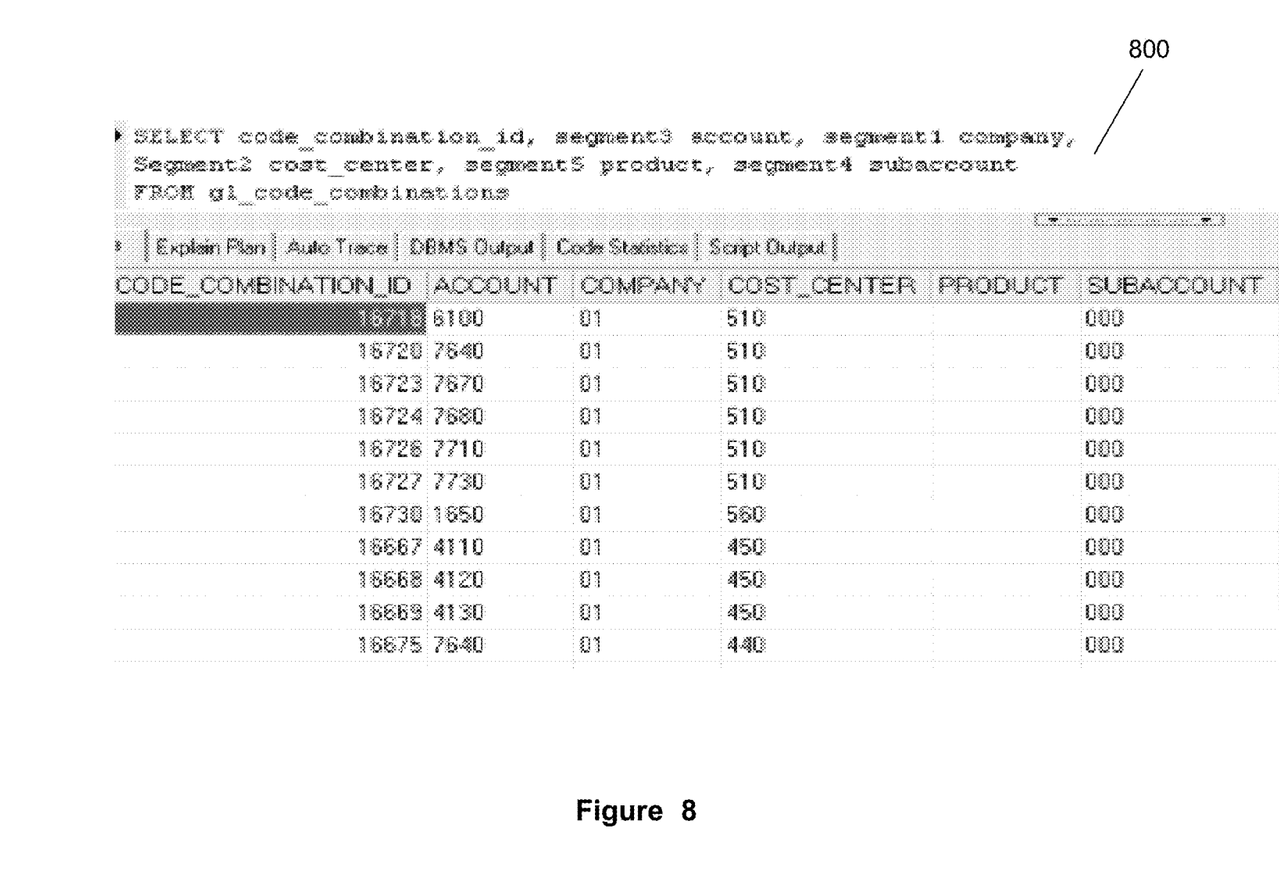
FIG. 8 illustrates an exemplary table that shows a code_combination_ID view in accordance with an embodiment.

FIG. 8 illustrates an exemplary table that shows a code_combination_ID (CCID) view in accordance with an embodiment. As shown in FIG. 8, the CCID VO 800 contains five segments from one context. If more than one context is presented, the segments can be equalized across contexts. The equalization process allows segments from different contexts that mean the same thing to be abstracted into a single VO column. Concatenated segments and display values can be exposed in the CCID VOs, with one column for the concatenated codes, and one column for the concatenated display values.

In an embodiment, when KFFs are changed, the CCID views can be regenerated to pull in the new or changed segments. In the example as shown in FIG. 8, when new accounting flexfields are enabled, such as during the creation of new ledgers, then the CCID VO needs to accommodate any new segments, in addition to the ones present from the existing ledgers, as part of the equalizing process.

When an additional segment, such as a "Sub Account" is added, the CCID VO is regenerated. The fact table can have an additional join to the Sub Account view object. In ADF, the metadata can be updated as well. When an incremental import is performed, a new physical table for SubAccount VO can be created.

Figure 9:
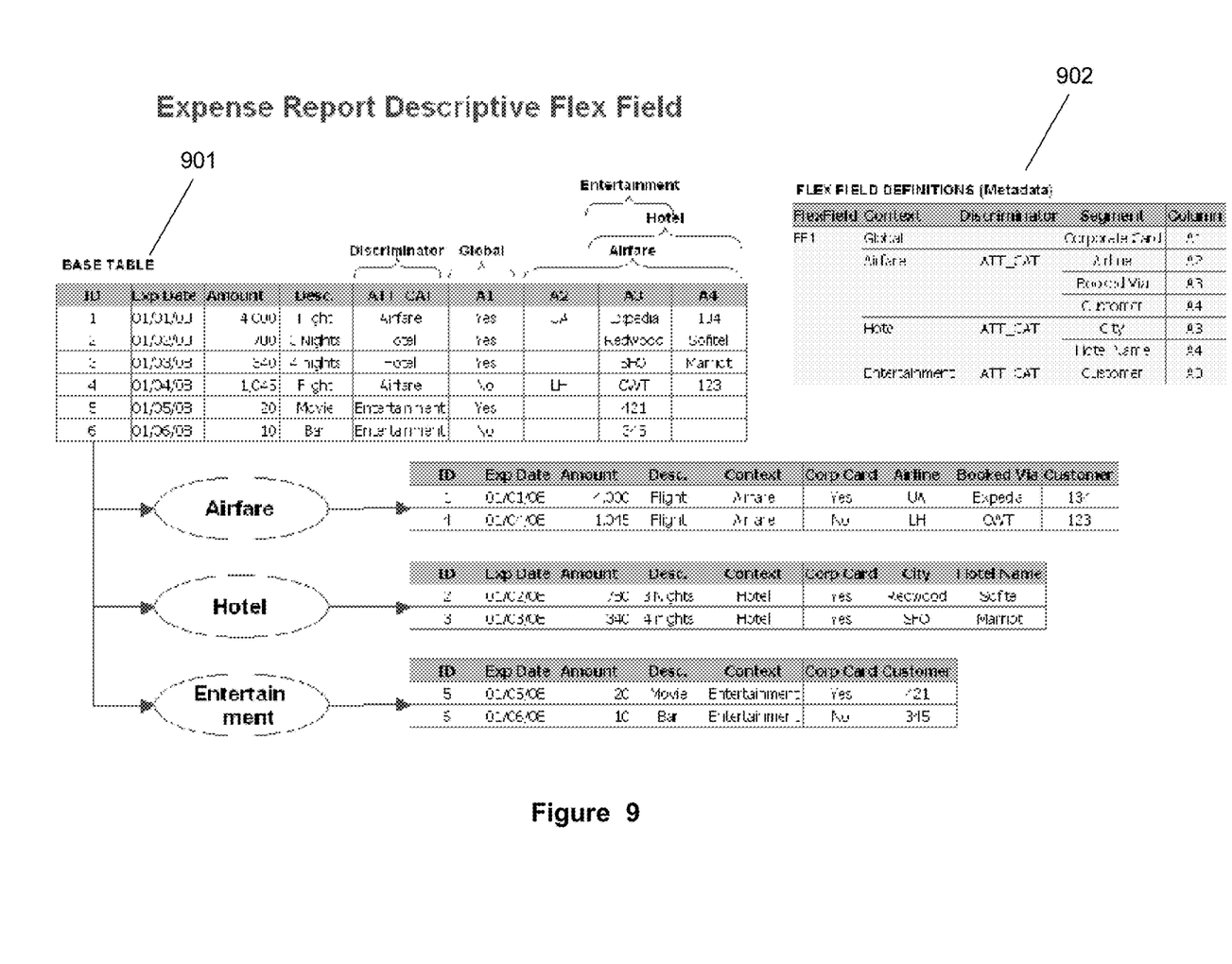
FIG. 9 illustrates an exemplary descriptive flexfields in accordance with an embodiment.

In an embodiment, exemplary descriptive flexfields (DFFs) allow users to store different attributes. FIG. 9 illustrates an exemplary DFF in accordance with an embodiment. As shown in FIG. 9, based on the metadata stored in a flex field definition table 901, an expense report base table 902 can use a same attribute to store different information. In this example, column A3 in the base table stores both the information of "BookedVia" in one context for Airfare segment, and the information of "City" in another context for Hotel segment.

Figure 10:
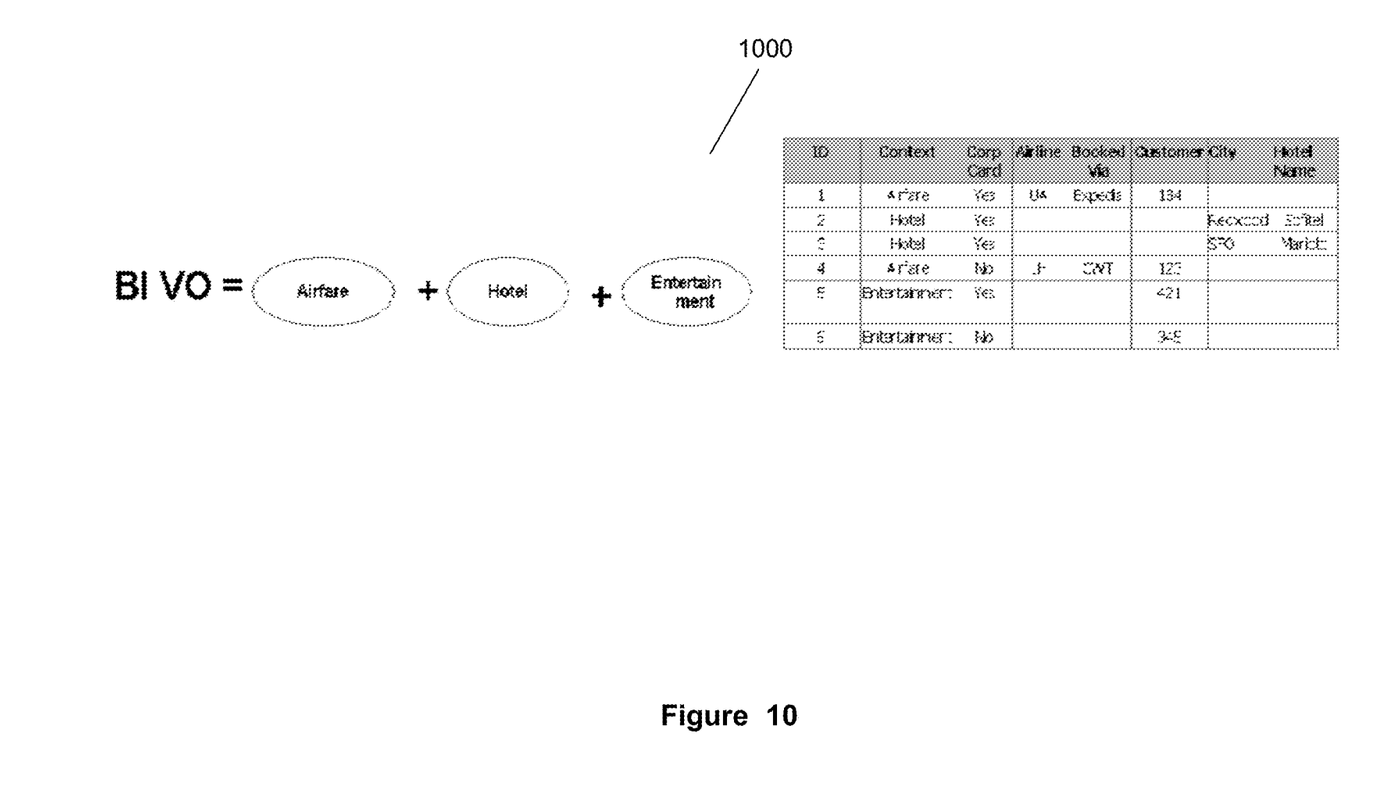
FIG. 10 illustrates an exemplary business intelligence view object in accordance with an embodiment.

Furthermore, Segments can be equalized for a business intelligence (BI) VO. FIG. 10 illustrates an exemplary BI VO in accordance with an embodiment. As shown in FIG. 10, the exemplary BI VO 1000, which corresponds to the expense report base table in FIG. 9, includes different segments: Airfare, Hotel, and Entertainment. In this example, Customer segment exists in two segments: Airfare and Entertainment. The application can combine the information in these two segment and present only one Customer column in the application BI VO.

In an embodiment, when segments are based on ID or translated value sets, application view generation can include additional meaning and description columns in the application VO. In the above example, the Airline segment can store the codes for airlines along with "Airline_Meaning" and "Airline_Description," which can also be flattened into the application VO.

The present invention may be conveniently implemented using a conventional general purpose or a specialized digital computer or microprocessor programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The code examples given are presented for purposes of illustration. It will be evident that the techniques described herein may be applied using other code languages, and with different code.

The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A method for providing data flexibility in a business intelligence (BI) server associated with a data warehouse, comprising:
   providing an administration tool on a BI server between an application framework and a data warehouse,
      wherein a definition of the data warehouse is stored in a repository model,
      wherein the application framework implements a plurality of different types of BI applications and comprises a plurality of data objects, and
      wherein each data object is associated with one or more of a plurality of data sources associated with the plurality of BI applications, and comprises a query that fetches a record from the one or more data sources and an implementation logic configured to manipulate the record fetched by the query;
   providing, on the administration tool, a physical model and a logical model,
      wherein the physical model defines relationships between the plurality of data sources, and
      wherein the logical model defines data in the data warehouse and corresponds to one or more target tables in the data warehouse,
   importing the plurality of data objects into the physical model;
   mapping the physical model to the logical model based on a rule encapsulating an input/output mechanism comprising an input received by the BI server from an associated user of the BI server, the input comprising one or more customized mappings selected by the associated user of the BI server;
   detecting, via the administration tool, changes in one or more of the plurality of imported data objects based on an output of the input/output mechanism, wherein the detected changes comprise one or more elements selected from the group consisting of modifying attributes of a data object, adding a data object, and deleting a data object;
   updating the logical model in the administration tool, with the detected changes;
   publishing the detected changes to an extender associated with the data warehouse, wherein the extender operates to read extract, transform and load (ETL) metadata from a metadata service, extend the ETL metadata by applying the detected changes thereto, and invoke an implementation module associated with the data warehouse to update at least one of the target tables in the data warehouse using the extended ETL metadata;

generating, by the extender, an XML output document that contains information on tables created, modified, or searched in the data warehouse by the implementation module, and information on columns, keys and references associated with the tables created, modified or searched; and providing the XML output document to the administration tool, wherein the XML output document is configured to be used by the administration tool to modify the definition of the data warehouse stored in the repository mode.

2. The method according to claim 1, further comprising: displaying at least one data source associated with the application framework in a connection pool.

3. The method according to claim 1, wherein:

the one or more data objects are view objects (VOs); and the rule comprises logic for mapping the physical model to the logical model comprising:

loop through the source physical objects to determine if any of the source physical objects apply to the target logical object;

selectively modify objects that can be modified;

selectively create new objects for objects that cannot be modified; and pass along the objects to the next rule that should be run.

4. The method according to claim 1, further comprising: processing incremental changes in the one or more data objects.

5. The method according to claim 1, further comprising: dragging and dropping, via the administration tool, the one or more data objects from the physical model into the logical model.

6. The method according to claim 1, further comprising: passing one or more authentication token from the administration tool to the extender.

7. The method according to claim 1, wherein the extender uses one or more templates to extend the data warehouse.

8. The method according to claim 1, wherein the extender receives an extension input that specifies both source end points and target end points, wherein the target end point describes target tables that needs to be extended, and the source end point describes data that needs to be loaded in the target tables.

9. The method according to claim 8, further comprising: transforming the extension input into a format that is acceptable by the extender.

10. The method according to claim 1, wherein the extender includes one or more target tables in the data warehouse based on the one or more data objects.

11. The method according to claim 1, further comprising using a framework to encapsulate rules for metadata conversions between the physical layer and the logical layer.

12. A system for providing data flexibility in a business intelligence (BI) server associated with a data warehouse, comprising:

one or more microprocessors;

a BI server running on the one or more microprocessors, wherein the BI server resides between an application framework and a data warehouse, wherein a definition of the data warehouse is stored in a repository model, wherein the application framework implements a plurality of different types of BI applications and comprises a plurality of data objects, and wherein each data object is associated with one or more of a plurality of data sources associated with the plurality of BI applications, and comprises a query that fetches a record from the one or more data sources and an implementation logic configured to manipulate the record fetched by the query;

an administration tool on the BI server, wherein the administration tool comprises a physical model and a logical model, wherein the physical model defines relationships between the plurality of data sources, wherein the logical model defines data in the data warehouse and corresponds to one or more target tables in the data warehouse, and wherein the administration tool is configured to import the plurality of data objects into the physical model from the application framework, map the physical model to the logical model based on a rule encapsulating an input/output mechanism comprising an input received by the BI server from an associated user of the BI server, the input comprising one or more customized mappings selected by the associated user of the BI server, detect changes in one or more of the plurality of imported data objects based on an output of the input/output mechanism, wherein the detected changes comprise one or more elements selected from the group consisting of modifying attributes of a data object, adding a data object, and deleting a data object, and update the logical model in the administration tool, with the detected changes; and an extender, associated with the data warehouse, that operates to receive a publication of the changes in the one or more data objects detected by the administration tool, read extract, transform and load (ETL) metadata from a metadata service, extend the ETL metadata by applying the detected changes thereto, and invoke an implementation module associated with the data warehouse to update at least one of the target tables in the data warehouse using the extended ETL metadata, wherein the extender generates an XML output document that contains information on tables created, modified, or searched in the data warehouse by the implementation module, and information on columns, keys and references associated with the tables created, modified or searched, and wherein the extender provides the XML output document to the administration tool, wherein the XML output document is configured to be used by the administration tool to modify the definition of the data warehouse stored in the repository mode.

13. The system according to claim 12, further comprising one or more authentication tokens that are passed from the administration tool to the extender.

14. The system according to claim 12, wherein the detected changes are transformed into a format that is acceptable by the extender.

15. The system of according to claim 12, wherein the extender uses one or more templates to extend the data warehouse.

16. The system of according to claim 12, wherein the extender receives an extension input that specifies both source end points and target end points, wherein the target end point describes target tables that needs to be extended, and the source end point describes data that needs to be loaded in the target tables.

17. A non-transitory machine readable storage medium having instructions stored thereon that when executed cause a system to perform a method comprising:
   providing an administration tool on a BI server between an application framework and a data warehouse,
      wherein a definition of the data warehouse is stored in a repository model,
      wherein the application framework implements a plurality of different types of BI applications and comprises a plurality of data objects, and
      wherein each data object is associated with one or more of a plurality of data sources associated with the plurality of BI applications, and comprises a query that fetches a record from the one or more data sources and an implementation logic configured to manipulate the record fetched by the query;
   providing, on the administration tool, a physical model and a logical model,
      wherein the physical model defines relationships between the plurality of data sources, and
      wherein the logical model defines data in the data warehouse and corresponds to one or more target tables in the data warehouse, and
   importing the plurality of data objects into the physical model;
   mapping the physical model to the logical model based on a rule encapsulating an input/output mechanism comprising an input received by the BI server from an associated user of the BI server, the input comprising one or more customized mappings selected by the associated user of the BI server;
   detecting, via the administration tool, changes in one or more of the plurality of imported data objects based on an output of the input/output mechanism, wherein the detected changes comprise one or more elements selected from the group consisting of modifying attributes of a data object, adding a data object, and deleting a data object;
   updating the logical model in the administration tool, with the detected changes;
   publishing the detected changes to an extender associated with the data warehouse, wherein the extender operates to
      read extract, transform and load (ETL) metadata from a metadata service,
      extend the ETL metadata by applying the detected changes thereto, and
      invoke an implementation module associated with the data warehouse to update at least one of the target tables in the data warehouse using the extended ETL metadata;
   generating, by the extender, an XML output document that contains information on tables created, modified, or searched in the data warehouse by the implementation module, and information on columns, keys and references associated with the tables created, modified or searched; and
   providing the XML output document to the administration tool, wherein the XML output document is configured to be used by the administration tool to modify the definition of the data warehouse stored in the repository mode.

18. The non-transitory machine readable storage medium according to claim 17, wherein the detected changes are transformed into a format that is acceptable by the extender.

19. The non-transitory machine readable storage medium according to claim 17, wherein the extender uses one or more templates to extend the data warehouse.

20. The non-transitory machine readable storage medium according to claim 17, wherein the extender receives an extension input that specifies both source end points and target end points, wherein the target end point describes target tables that needs to be extended, and the source end point describes data that needs to be loaded in the target tables.

* * * * *

UNITED STATES PATENT AND TRADEMARK OFFICE
CERTIFICATE OF CORRECTION

PATENT NO. : 10,437,846 B2
APPLICATION NO. : 13/100245
DATED : October 8, 2019
INVENTOR(S) : Venkatasubramanian et al.

Page 1 of 1

It is certified that error appears in the above-identified patent and that said Letters Patent is hereby corrected as shown below:

In the Specification

In Column 1, Line 31, after "No." insert -- 13/100,249, --.

In the Claims

In Column 13, Line 4, in Claim 15, after "system" delete "of".

In Column 13, Line 7, in Claim 16, after "system" delete "of".

In Column 13, Line 35, in Claim 17, after "warehouse," delete "and".

Signed and Sealed this
Thirteenth Day of October, 2020

Andrei Iancu
*Director of the United States Patent and Trademark Office*